United States Patent
Jiang et al.

(10) Patent No.: US 12,108,452 B2
(45) Date of Patent: Oct. 1, 2024

(54) METHOD FOR SHARING CHANNEL OCCUPANCY TIME, TERMINAL DEVICE, AND NETWORK DEVICE

(71) Applicant: VIVO MOBILE COMMUNICATION CO., LTD., Dongguan (CN)

(72) Inventors: Lei Jiang, Dongguan (CN); Gen Li, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 45 days.

(21) Appl. No.: 17/730,140

(22) Filed: Apr. 26, 2022

(65) Prior Publication Data
US 2022/0256605 A1    Aug. 11, 2022

Related U.S. Application Data

(63) Continuation of application No. PCT/CN2020/126125, filed on Nov. 3, 2020.

(30) Foreign Application Priority Data

Nov. 6, 2019 (CN) .......................... 201911078027.1

(51) Int. Cl.
  *H04W 74/08* (2024.01)
  *H04W 24/08* (2009.01)
  *H04W 72/044* (2023.01)
  *H04W 74/00* (2009.01)
  *H04W 74/0816* (2024.01)

(52) U.S. Cl.
  CPC ....... *H04W 74/0816* (2013.01); *H04W 24/08* (2013.01); *H04W 72/0473* (2013.01); *H04W 74/002* (2013.01); *H04W 74/0866* (2013.01)

(58) Field of Classification Search
None
See application file for complete search history.

(56) References Cited

U.S. PATENT DOCUMENTS

| 10,779,289 B2 * | 9/2020 | Myung ................ H04L 1/1614 |
| 2016/0080974 A1 | 3/2016 | Barriac et al. |
| 2019/0104482 A1 | 4/2019 | Wilhelmsson et al. |

(Continued)

FOREIGN PATENT DOCUMENTS

| CN | 105611537 A | 5/2016 |
| CN | 111107637 A | 5/2020 |

OTHER PUBLICATIONS

Nokia, Nokia Shanghai Bell, Feature Lead's Summary #2 on Channel Access Procedures, Agenda item: 7.2.2.2.1, 3GPP TSG RAN WG1 Meeting #98bis, R1-1911706, Chongqing, P.R. China, Oct. 14-20, 2019 (Year: 2019).*

(Continued)

*Primary Examiner* — Benjamin Lamont
(74) *Attorney, Agent, or Firm* — IPX PLLC (57) ABSTRACT

A method for sharing a channel occupancy time and a communications device are provided. The method is executed by a first device and includes: sending information related to a power detection threshold to a second device. The information related to the power detection threshold includes: a maximum power detection threshold of user equipment, a power detection threshold for Channel Occupancy Time (COT) sharing, or a type of information transmitted by the network device.

20 Claims, 8 Drawing Sheets

(56) References Cited

U.S. PATENT DOCUMENTS

| | | | |
|---|---|---|---|
| 2019/0268912 A1 | 8/2019 | Myung et al. | |
| 2020/0275484 A1* | 8/2020 | Xu | H04W 74/0808 |
| 2021/0298049 A1* | 9/2021 | Myung | H04L 1/1896 |
| 2021/0307036 A1* | 9/2021 | Myung | H04L 5/0053 |
| 2021/0368351 A1* | 11/2021 | Cui | H04W 74/002 |
| 2021/0392685 A1* | 12/2021 | Myung | H04W 72/1263 |
| 2021/0410185 A1* | 12/2021 | Do | H04W 16/14 |
| 2022/0095301 A1* | 3/2022 | Oviedo | H04W 74/0808 |
| 2022/0116152 A1* | 4/2022 | Iyer | H04L 1/188 |
| 2022/0304059 A1* | 9/2022 | Lei | H04W 74/08 |

OTHER PUBLICATIONS

International Search Report issued in corresponding International Application No. PCT/CN2020/126125, mailed Jan. 25, 2021, 6 pages.

3GPP, 3rd Generation Partnership Project, Technical Specification Group Radio Access Network, "Physical layer procedures for shared spectrum channel access(Release 15)", 3GPP TS 37.213 V15.2.0, Mar. 27, 2019.

\* cited by examiner

METHOD FOR SHARING CHANNEL OCCUPANCY TIME, TERMINAL DEVICE, AND NETWORK DEVICE

CROSS-REFERENCE TO RELATED APPLICATIONS

This application is a continuation of International Application No. PCT/CN2020/126125, filed Nov. 3, 2020, which claims priority to Chinese Patent Application No. 201911078027.1, filed Nov. 6, 2019. The entire contents of each of the above-referenced applications are expressly incorporated herein by reference.

TECHNICAL FIELD

Embodiments of this application relate to a communications field, and in particular to a method for sharing a channel occupancy time, a terminal device, and a network device.

BACKGROUND

In a mobile communications system, an unlicensed band may serve as supplement of a licensed band, to help an operator perform service capacity expansion. To keep consistent deployment of the licensed band and the unlicensed band in a New Radio (NR) system and maximize unlicensed accesses based on the NR system as much as possible, an unlicensed band may work in bands of 5 GHz, 37 GHz, and 60 GHz. A large bandwidth (80 MHz or 100 MHz) of the unlicensed band can reduce implementation complexity of a base station (gNB) and a terminal (e.g., User Equipment (UE)). However, because the unlicensed band is shared by a plurality of Radio Access Technologies (RATs), such as wireless fidelity WiFi, a radar, Long Term Evolution-License Assisted Access (LTE-LAA), the unlicensed band in use must comply with some rules to ensure that all devices can use a resource fairly. The rules include Listen Before Talk (LBT), a Maximum Channel Occupancy Time (MCOT), and the like.

For a transmission node, the transmission node may also be called an initiating device and may include the base station or the UE. After the transmission node obtains a channel, the transmission node may share a Channel Occupancy Time (COT) with a receiving node. The receiving node may also be called a responding device and may also include the UE or the base station. That is, when the base station is the initiating device, the UE is the responding device; or when the UE is the initiating device, the base station is the responding device.

For scheduled UE, the base station may not learn through Uplink Control Information (UCI) whether the UE shares the COT or not. or a type of information that can be transmitted in the shared COT. For Configured Grant (CG) UE, even if it is indicated through a COT sharing indication in the UCI that the gNB shares the COT, the gNB may not be able to distinguish what kind of information can be transmitted in the shared COT, so that the scheduled UE and configured grant UE cannot flexibly share the COT of the UE with the gNB.

SUMMARY

Embodiments of this application provide a method for sharing a channel occupancy time, a terminal device, and a network device, so that a COT of UE can be shared with the network device flexibly.

According to a first aspect, a method for sharing a channel occupancy time is provided and is applied to a first device. The method includes: sending information related to a power detection threshold to a second device where the information related to a power detection threshold includes: a maximum power detection threshold of user equipment, a power detection threshold for channel occupancy time COT sharing, or a type of information transmitted by a network device.

According to a second aspect, a method for sharing a channel occupancy time is provided and applied to a second device. The method includes: receiving information related to a power detection threshold sent by a first device, where the information related to a power detection threshold includes: a maximum power detection threshold of user equipment, a power detection threshold for COT sharing, or a type of information transmitted by a network device.

According to a third aspect, a communications device is provided, including: a processing module, configured to send information related to a power detection threshold, where the information related to a power detection threshold includes: a maximum power detection threshold of user equipment, a power detection threshold for COT sharing, or a type of information transmitted by a network device.

According to a fourth aspect, a communications device is provided, including: a performing module, configured to receive information related to a power detection threshold, where the information related to a power detection threshold includes: a maximum power detection threshold of user equipment, a power detection threshold for COT sharing, or a type of information transmitted by a network device.

According to a fifth aspect, a communications device is provided, including: a processor, a memory, and a computer program that is stored in the memory and that can run on the processor. When the computer program is executed by the processor, the steps of the method for sharing a channel occupancy time according to the first aspect are implemented.

According to a sixth aspect, a communications device is provided, including: a processor, a memory, and a computer program that is stored in the memory and that can be run on the processor. When the computer program is executed by the processor, the steps of the method for sharing a channel occupancy time according to the second aspect are implemented.

According to a seventh aspect, a computer-readable storage medium is provided, where the computer-readable storage medium stores a computer program, and when the computer program is executed by a processor, the steps of the method for sharing a channel occupancy time according to the first aspect or the second aspect are implemented.

In the embodiments of this application, in a case that the first device is the network device and the second device is the user equipment, the network device dynamically indicates, according to the type of information to be transmitted in the shared COT initiated by the UE, the power detection threshold (e.g., Energy Detection threshold (ED threshold)) for the UE to perform LBT, and the UE can perform, through the information related to a power detection threshold, the LBT by using a corresponding power detection threshold; and in a case that the first device is the UE and the second device is the network device, the UE can determine, by itself, the power detection threshold for performing the LBT, and the network device can transmit, according to the indicated information related to a power detection threshold, a corresponding type of information in the shared COT initiated by the UE, so that the COT of the UE can be flexibly shared with the network device.

BRIEF DESCRIPTION OF DRAWINGS

The accompanying drawings illustrated herein are provided to further understand this application and form a part of this application. The exemplary embodiments of this application and the descriptions thereof are used to explain this application and do not constitute an improper limitation on this application. In the accompanying drawings.

DESCRIPTION OF EMBODIMENTS

To make the objectives, technical solutions, and advantages of this application clearer, the following clearly describes the technical solutions of this application with reference to the specific embodiments of this application and the corresponding accompanying drawings. Apparently, the described embodiments are merely some rather than all of the embodiments of this application. All other embodiments obtained by a person of ordinary skill in the art based on the embodiments of this application without creative efforts shall fall within the protection scope of this application. The term "and/or" in the embodiments of the specification indicates at least one of a former one and a latter one.

It should be understood that the technical solutions in the embodiments of this application may be applied to various communications systems, such as a Long Term Evolution (LTE) system, a LTE Frequency Division Duplex (FDD) system, LTE Time Division Duplex (TDD), a Universal Mobile Telecommunication System (UMTS), a Worldwide Interoperability for Microwave Access (WiMAX) communications system, a 5G system, an NR system, or a subsequent evolution communications system.

In the embodiments of this application, a terminal device may include but is not limited to a Mobile Station (MS), a mobile terminal, a mobile telephone, UE, a handset, portable equipment, a vehicle, and the like. The terminal device may communicate with one or more core networks by using a Radio Access Network (RAN). For example, the terminal device may be a mobile telephone (or referred to as a "cellular" telephone), a computer having a wireless communication function, or the like; or the terminal device may further be a portable, pocket-sized, handheld, computer built-in, or in-vehicle mobile apparatus.

In the embodiments of this application, a network device is an apparatus that is deployed in a radio access network and that is configured to provide a wireless communication function for the terminal device. The network device may be a base station, and the base station may include various types of macro base stations, micro base stations, relay stations, or access points. In systems that use different radio access technologies, devices that have a base station function may have different names. For example, in an LTE network, the network device is referred to as an Evolved NodeB (eNB, or eNodeB), and in a 3rd Generation (3G) network, the network device is referred to as a Node B or a network device in a subsequent evolved communications system. However, the terms do not constitute a limitation.

Figure 1:
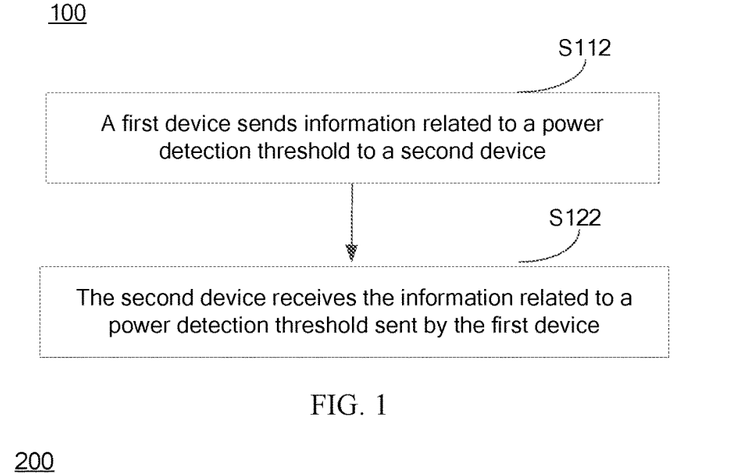
FIG. 1 is a schematic flowchart of a method for sharing a channel occupancy time according to an embodiment of this application.

As shown in FIG. 1, an embodiment of this application provides a method 100 for sharing a channel occupancy time. The method can be performed by a first device and a second device. In other words, the method can be performed by software or hardware installed in the first device and the second device. The method includes the following steps.

S112: The first device sends information related to a power detection threshold to the second device.

In this embodiment of this application, UE serves as an initiating device and a base station serves as a responding device.

In this step, the first device may send the information related to a power detection threshold to the second device. The information related to a power detection threshold includes: a maximum power detection threshold of user equipment, a power detection threshold for COT sharing, or a type of information transmitted by a network device.

In some embodiments, in a case that the first device is the network device and the second device is the user equipment, this step includes: the network device sends the information related to a power detection threshold to the UE. In this case, the network device transmits, in a shared COT, a type of information corresponding to indicated information related to a power detection threshold. The UE can perform, through the information related to a power detection threshold, LBT by using a power detection threshold corresponding to information transmitted by the network device.

On the contrary, in a case that the first device is the UE and the second device is the network device, this step includes: the UE sends the information related to a power detection threshold to the network device. In this case, the UE can determine, by itself, a power detection threshold for performing the LBT, and the network device can transmit the corresponding type of information in the shared COT according to the indicated information related to a power detection threshold.

S122: The second device receives the information related to a power detection threshold sent by the first device.

Therefore, in the method for sharing a channel occupation time according to this embodiment of this application, in a case that the first device is the network device and the second device is the user equipment, the network device dynamically indicates an ED threshold for the UE according to the type of information to be transmitted in the shared COT by itself, and the UE can perform, through the information related to a power detection threshold, the LBT by using a corresponding power detection threshold, so that the COT of the UE can be flexibly shared with the network device.

Furthermore, in the method for sharing a channel occupation time in this embodiment of this application, in a case that the first device is the UE and the second device is the network device, the UE can determine, by itself, the power detection threshold for performing the LBT, and the network device can transmit the corresponding type of information in the shared COT according to the indicated information related to a power detection threshold, so that the COT of the UE can be flexibly shared with the network device.

Figure 2:
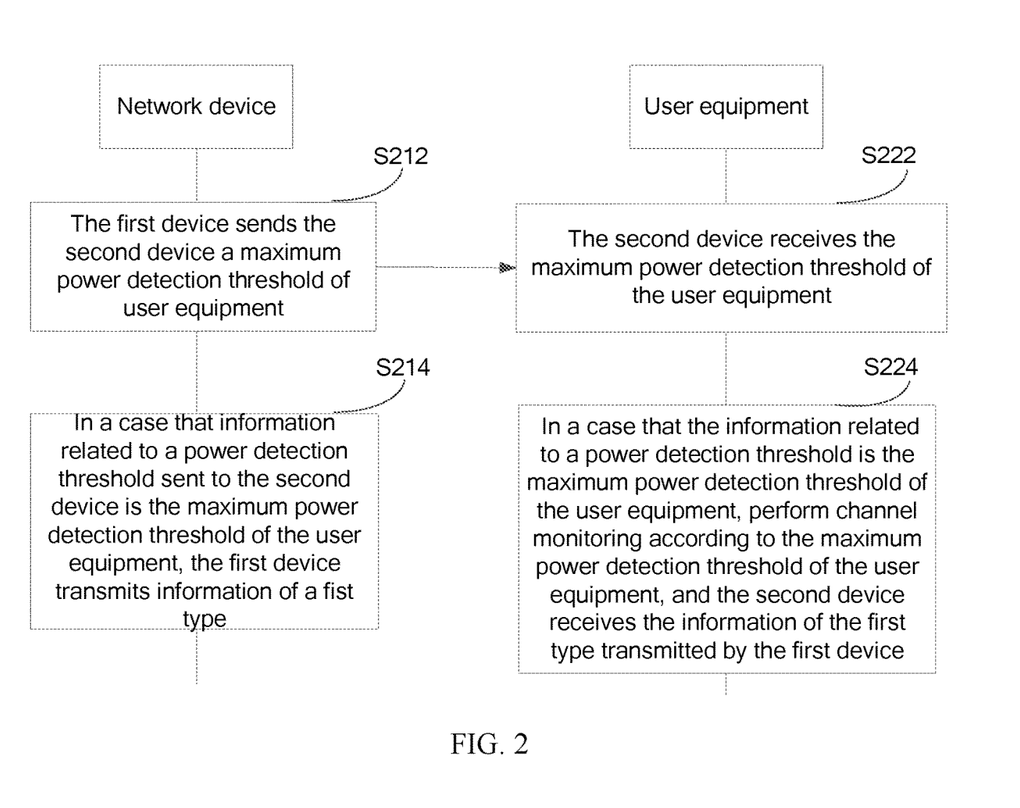
FIG. 2 is a schematic flowchart of a method for sharing a channel occupancy time according to another embodiment of this application.

As shown in FIG. 2, an embodiment of this application provides a method 200 for sharing a channel occupancy time. The method can be performed by a first device and a second device. In other words, the method can be performed by software or hardware installed in the first device and the second device. The method includes the following steps.

S212: The first device sends the second device a maximum power detection threshold of user equipment.

In this embodiment of this application, UE serves as an initiating device and a base station serves as a responding device. The first device may be a network device, such as a base station. The second device may be the UE.

In this step, the first device may send information related to a power detection threshold to the second device. In this embodiment, the information related to a power detection threshold includes the maximum power detection threshold of the user equipment.

For example, in a case that the second device is scheduled UE, uplink data transmission cannot additionally indicate, like CG transmission, whether a gNB can share a COT through an UCI. In addition, information of the scheduled UE is determined by the gNB, including a LBT type. Therefore, the gNB learns a MCOT of the UE after a channel is accessed successfully, and the gNB can determine by itself whether to share a UE-initiated COT, and indicate it to the UE through this step.

In this step, on the premise that the gNB configures, for the UE, a power detection threshold for COT sharing, the gNB can indicate the maximum power detection threshold of the user equipment to the UE according to a type of information to be transmitted, so as to prevent, in a case that the gNB skips performing downlink data transmission, the UE from still performing LBT by using the power detection threshold for COT sharing. Usually, the power detection threshold for COT sharing is lower than the maximum power detection threshold of the user equipment, which will cause the UE to reduce a probability of channel access. This step can help to prevent the UE from reducing the probability of channel access.

S214: In a case that the information related to a power detection threshold sent to the second device is the maximum power detection threshold of the user equipment, the first device transmits information of a first type.

In a possible implementation, a type of information transmitted by the network device includes a first type, where the first type corresponds to the maximum power detection threshold of the user equipment.

Because the maximum power detection threshold of the user equipment corresponds to the information of the first type, the first device transmits the information of the first type in a case that the information related to a power detection threshold sent to the second device is the maximum power detection threshold of the user equipment.

S222: The second device receives the maximum power detection threshold of the user equipment.

The maximum power detection threshold of the user equipment is received, and the LBT is performed by using the maximum power detection threshold of the user equipment.

S224: In a case that the information related to a power detection threshold is the maximum power detection threshold of the user equipment, channel monitoring is performed according to the maximum power detection threshold of the user equipment, and the second device receives the information of the first type transmitted by the first device.

The information of the first type may be: that a received object includes a control signal, a control channel, a broadcast signal, or a broadcast channel (control/broadcast signals/channels) of the user equipment.

Therefore, in the method for sharing a channel occupation time according to this embodiment of this application, the network device can dynamically indicate an ED threshold for the UE to perform the LBT. In a case that the information of the first type needs to be sent to a user, the maximum power detection threshold of the user equipment is sent to the UE to indicate that the UE performs the LBT by using the maximum power detection threshold of the user equipment, thus preventing the UE from still performing the LBT by using the power detection threshold for COT sharing, and reducing a probability of channel access.

Figure 3:
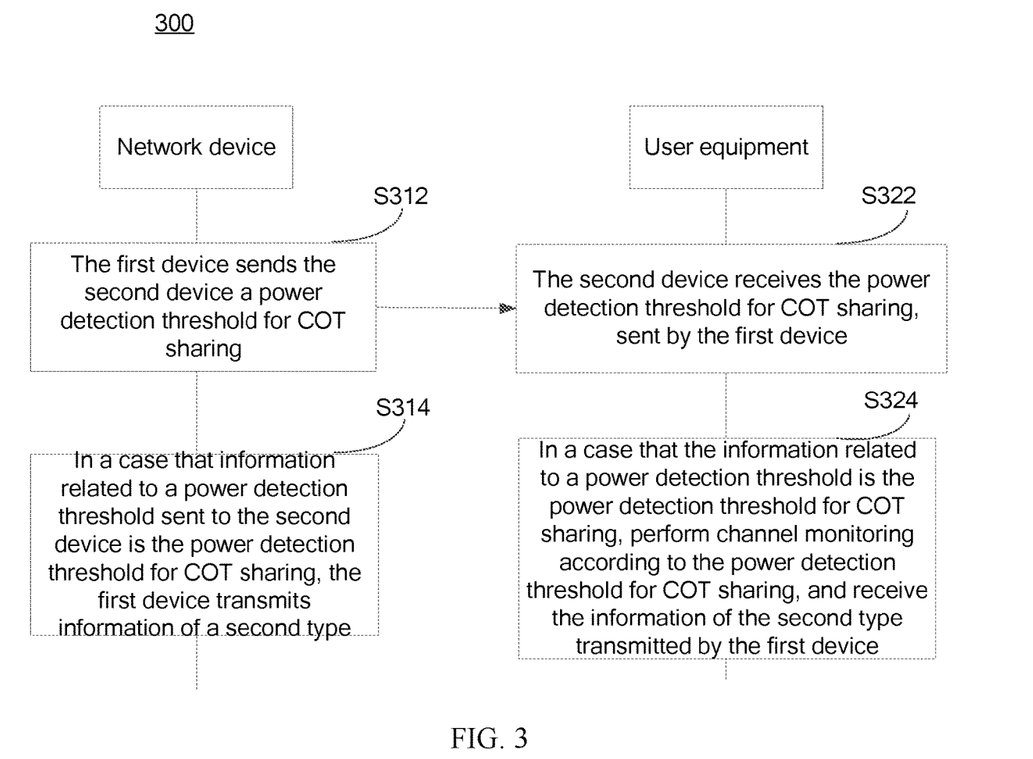
FIG. 3 is a schematic flowchart of a method for sharing a channel occupancy time according to still another embodiment of this application.

As shown in FIG. 3, still another embodiment of this application provides a method 300 for sharing a channel occupancy time. The method can be performed by a first device and a second device. In other words, the method can be performed by software or hardware installed in the first device and the second device. The method includes the following steps.

S312: The first device sends the second device a power detection threshold for COT sharing.

In this embodiment of this application, UE serves as an initiating device and a base station serves as a responding device. The first device may be a network device, such as a base station. The second device may be the UE.

In this step, the first device may send information related to a power detection threshold to the second device. In this embodiment, the information related to a power detection threshold includes the power detection threshold for COT sharing.

S314: In a case that the information related to a power detection threshold sent to the second device is the power detection threshold for COT sharing, the first device transmits information of a second type.

A type of information transmitted by the network device includes a second type, where the second type corresponds to the power detection threshold for COT sharing. Because the power detection threshold for COT sharing corresponds to the information of the second type, the network device transmits the information of the second type.

S322: The second device receives the power detection threshold for COT sharing, sent by the first device.

In this embodiment, the power detection threshold for COT sharing is received, and LBT is performed by using the power detection threshold for COT sharing.

S324: In a case that the information related to a power detection threshold is the power detection threshold for COT sharing, the second device performs channel monitoring according to the power detection threshold for COT sharing, and receives the information of the second type transmitted by the first device.

The information of the second type may be: a received object includes a control signal, a control channel, a broadcast signal, or a broadcast channel of the user equipment, or is at least one of a downlink (DL) signal/channel of the user equipment. The DL signal/channel is a Physical Downlink Shared Channel (PDSCH), a Physical Downlink Control Channel (PDCCH), a reference signal, or the like.

Therefore, in the method for sharing a channel occupation time according to this embodiment of this application, in a case that the first device is the network device and the second device is the user equipment, the network device can dynamically indicate an ED threshold for the UE to perform LBT, so that the UE can perform, through the information related to a power detection threshold, the LBT by using a corresponding power detection threshold.

Figure 4:
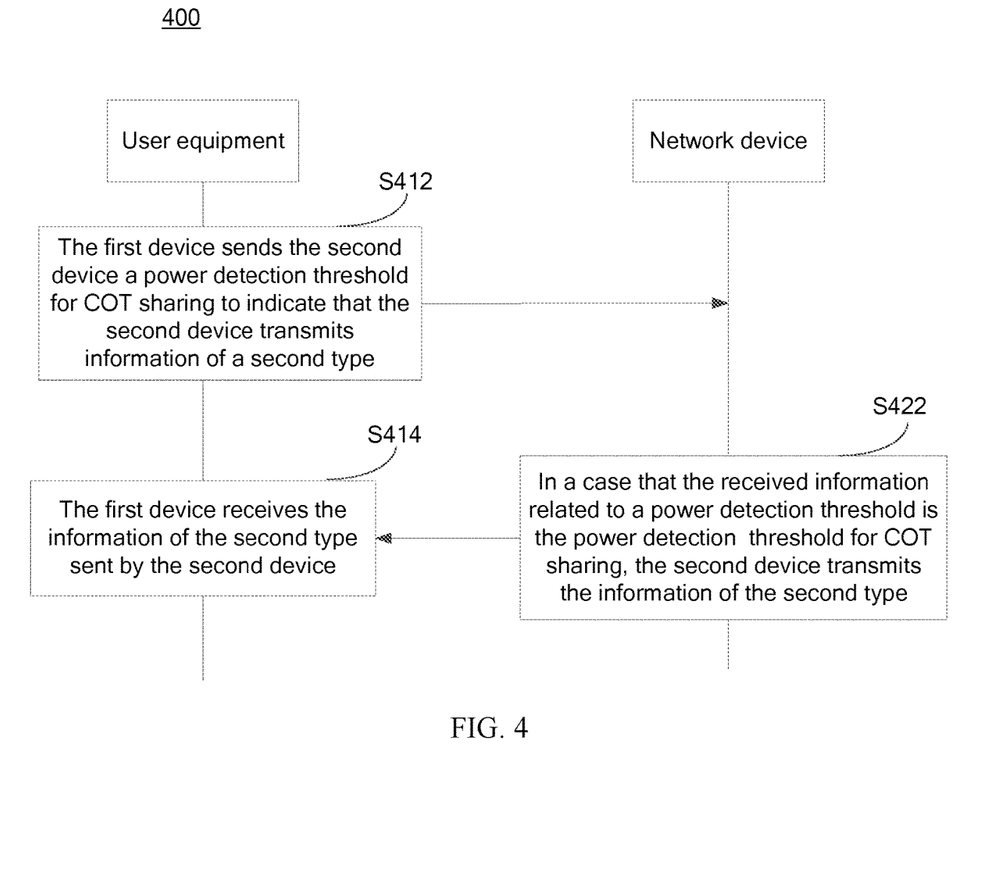
FIG. 4 is a schematic flowchart of a method for sharing a channel occupancy time according to yet another embodiment of this application.

As shown in FIG. 4, an embodiment of this application provides a method 400 for sharing a channel occupancy time. The method can be performed by a first device and a second device. In other words, the method can be performed by software or hardware installed in the first device and the second device.

In this embodiment of this application, UE serves as an initiating device and a base station serves as a responding device.

The first device may be the UE. The second device may be a network device, such as a base station.

The method includes the following steps.

S412: The first device sends the second device a power detection threshold for COT sharing to indicate that the second device transmits information of a second type.

In this step, when the first device obtains a channel, it can send information related to a power detection threshold to the second device. In this embodiment, the information related to a power detection threshold includes the power detection threshold for COT sharing, thereby indicating that the network device transmits the information of the second type. Furthermore, the first device can perform LBT based on the power detection threshold for COT sharing.

S422: In a case that received information related to a power detection threshold is the power detection threshold for COT sharing, the second device transmits the information of the second type.

In a case that the received information related to a power detection threshold is the power detection threshold for COT sharing, the second device learns that transmission nodes share the COT. Furthermore, because the power detection threshold for COT sharing corresponds to the information of the second type, the network device, as the second device, transmits the information of the second type.

S414: The first device receives the information of the second type sent by the second device.

The information of the second type may be: that a received object includes a control signal, a control channel, a broadcast signal, or a broadcast channel of the user equipment, or is at least one of a downlink signal/channel of the user equipment.

Therefore, in the method for sharing a channel occupation time according to this embodiment of this application, the UE can determine, by itself, a power detection threshold for performing the LBT, so that the network device can learn whether the UE shares the COT or not, and the network device can transmit a corresponding type of information in a shared COT according to the indicated information related to a power detection threshold.

Figure 5:
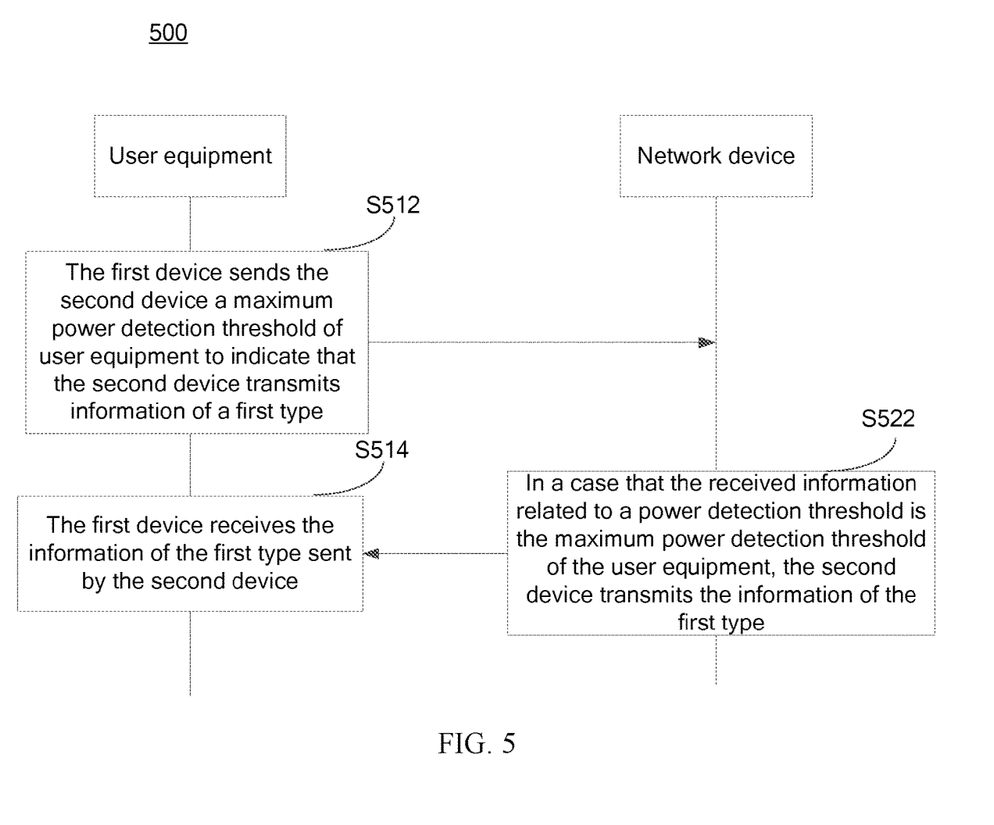
FIG. 5 is a schematic flowchart of a method for sharing a channel occupancy time according to still yet another embodiment of this application.

As shown in FIG. 5, an embodiment of this application provides a method 500 for sharing a channel occupancy time. The method can be performed by a first device and a second device. In other words, the method can be performed by software or hardware installed in the first device and the second device.

In this embodiment of this application, UE serves as an initiating device and a base station serves as a responding device.

The first device may be the UE. The second device may be a network device, such as a base station.

The method includes the following steps.

S512: The first device sends the second device a maximum power detection threshold of user equipment to indicate that the second device transmits information of a first type.

In this step, the first device may send information related to a power detection threshold to the second device after obtaining a channel. In this embodiment, the information related to a power detection threshold includes the maximum power detection threshold of the user equipment.

Therefore, it is indicated that the network device transmits the information of the first type, and a transmission time may also be limited to a certain period simultaneously. Furthermore, the first device can perform LBT based on the maximum power detection threshold of the user equipment.

S522: In a case that the received information related to a power detection threshold is the maximum power detection threshold of the user equipment, the second device transmits the information of the first type.

In a case that the maximum power detection threshold of the user equipment is received, the second devices learns that transmission nodes share a COT. Furthermore, because the maximum power detection threshold of the user equipment corresponds to the information of the first type, the network device, as the second device, transmits the information of the first type.

S514: The first device receives the information of the first type sent by the second device.

The information of the first type may be that a received object includes a control signal, a control channel, a broadcast signal, or a broadcast channel of the user equipment.

Therefore, in the method for sharing a channel occupation time according to this embodiment of this application, the UE can determine, by itself, a power detection threshold for performing the LBT, and the network device can transmit a corresponding type of information in a shared COT according to the indicated information related to a power detection threshold.

Figure 6:
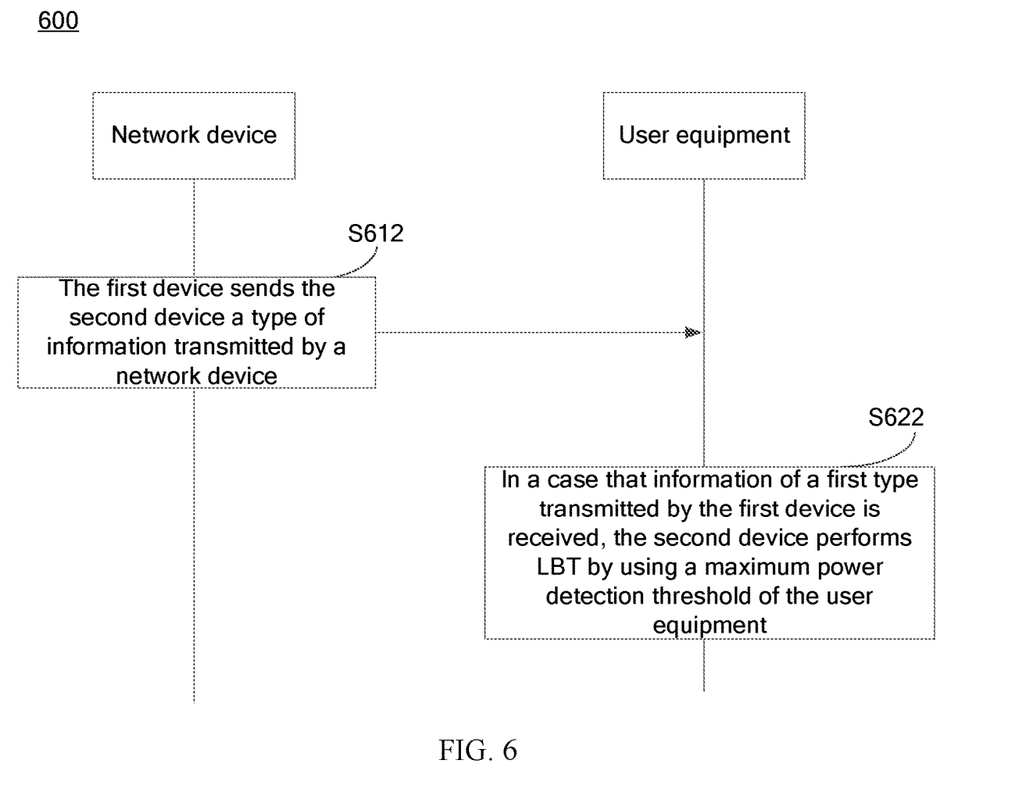
FIG. 6 is a schematic flowchart of a method for sharing a channel occupancy time according to a further embodiment of this application.

As shown in FIG. 6, an embodiment of this application provides a method 600 for sharing a channel occupancy time. The method can be performed by a first device and a second device. In other words, the method can be performed by software or hardware installed in the first device and the second device.

In this embodiment of this application, UE serves as an initiating device and a base station serves as a responding device.

The first device may be a network device, such as a base station. The second device may be the UE.

The method includes the following steps.

S612: The first device sends the second device a type of information transmitted by the network device.

In this step, the first device may send information related to a power detection threshold to the second device. In this embodiment, the information related to a power detection threshold includes the type of information transmitted by the network device.

In a case that the information related to a power detection threshold sent to the second device is information of a first type, it is indicated that the second device performs LBT by using a maximum power detection threshold of user equipment.

S622: In a case that the information of the first type transmitted by the first device is received, the second device performs the LBT by using the maximum power detection threshold of the user equipment.

Because the information of the first type corresponds to the maximum power detection threshold of the user equipment, in a case that the information of the first type transmitted by the first device is received, the second device performs the LBT by using the maximum power detection threshold of the user equipment.

Therefore, in the method for sharing a channel occupation time according to this embodiment of this application, the network device can dynamically indicate a power detection threshold for the UE to perform the LBT, so that the UE can perform, through the information related to a power detection threshold, the LBT by using a corresponding power detection threshold.

Figure 7:
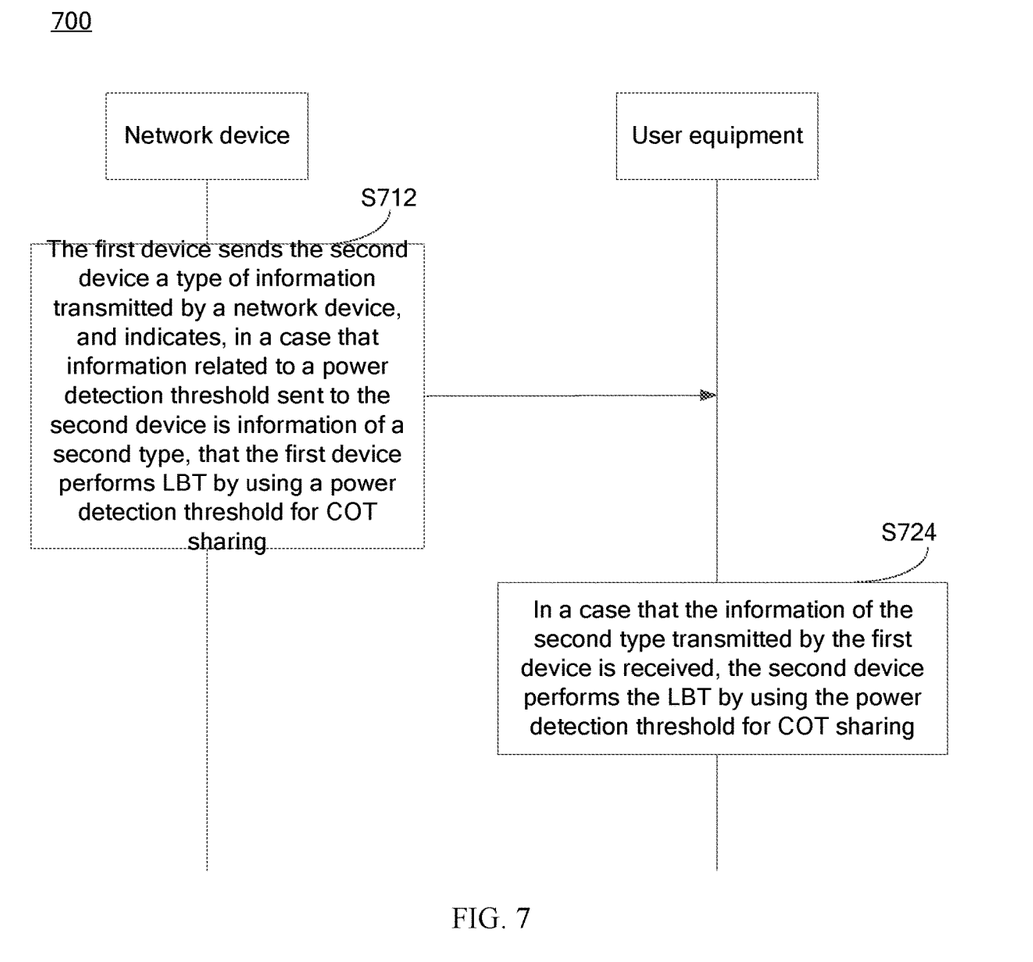
FIG. 7 is a schematic flowchart of a method for sharing a channel occupancy time according to a still further embodiment of this application.

As shown in FIG. 7, an embodiment of this application provides a method 700 for sharing a channel occupancy time. The method can be performed by a first device and a second device. In other words, the method can be performed by software or hardware installed in the first device and the second device.

In this embodiment of this application, UE serves as an initiating device and a base station serves as a responding device.

The first device may be a network device, such as a base station. The second device may be the UE.

The method includes the following steps.

S712: The first device sends the second device a type of information transmitted by the network device, and indicates, in a case that information related to a power detection threshold sent to the second device is information of a second type, that the first device performs LBT by using a power detection threshold for COT sharing.

In this step, the first device may send information related to a power detection threshold to the second device. In this embodiment, the information related to a power detection threshold includes the type of information transmitted by the network device.

S724: In a case that the information of the second type transmitted by the first device is received, the second device performs the LBT by using the power detection threshold for COT sharing.

Because the information of the second type corresponds to the power detection threshold for COT sharing, in a case that the information of the second type transmitted by the first device is received, the second device performs the LBT by using the power detection threshold for COT sharing.

The information of the second type may be: that a received object includes a control signal, a control channel, a broadcast signal, or a broadcast channel of the user equipment, or is at least one of a downlink signal/channel of the user equipment.

Therefore, in the method for sharing a channel occupation time according to this embodiment of this application, the UE can perform, through the information related to a power detection threshold, the LBT by using a corresponding power detection threshold.

Figure 8:
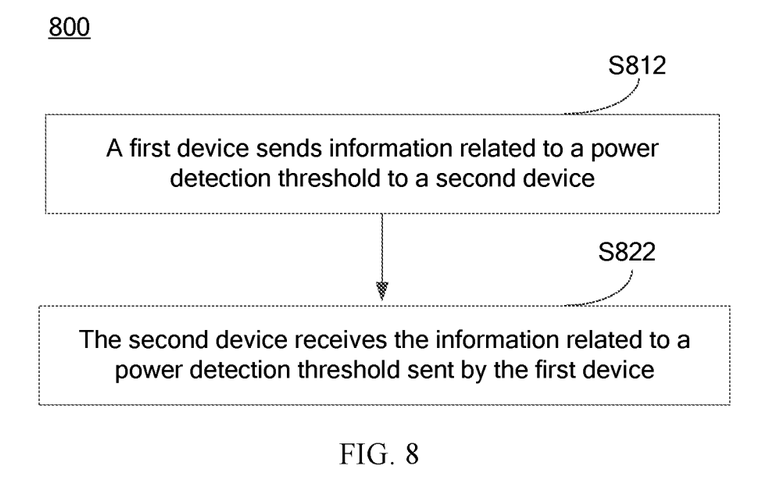
FIG. 8 is a schematic flowchart of a method for sharing a channel occupancy time according to a yet further embodiment of this application.

As shown in FIG. 8, an embodiment of this application provides a method 800 for sharing a channel occupancy time. The method can be performed by a first device and a second device. In other words, the method can be performed by software or hardware installed in the first device and the second device.

In this embodiment of this application, UE serves as an initiating device and a base station serves as a responding device.

The method includes the following steps, of which the same part as those described in the embodiments of FIG. 1 to FIG. 7 will not be described herein again.

S812: The first device sends information related to a power detection threshold to the second device.

The information related to a power detection threshold may be indicated through a specified field in control information. The information related to a power detection threshold includes: a maximum power detection threshold of user equipment, a power detection threshold for COT sharing, or a type of information transmitted by a network device.

In an implementation, in a case that the first device is the network device and the second device is the user equipment, the specified field in the control information is a first specified field in Downlink Control Information (DCI).

In an implementation, in a case that the first device is the user equipment and the second device is the network device, the specified field in the control information is a second specified field in UCI.

For example, in a case that the UE is CG UE, the UE dynamically indicates the information related to a power detection threshold through the second specified field in the UCI.

In an implementation, the first specified field is an added indication field in the DCI. The added indication field in the DCI may be used to indicate the information related to a power detection threshold, and it can be called "an indication field of the information related to a power detection threshold".

In an implementation, the second specified field is a COT sharing indication in the UCI or an added indication field in the UCI. The added indication field in the UCI may be used to indicate the information related to a power detection threshold, and it can be called "an indication field of the information related to a power detection threshold".

When the first specified field is the second specified field, which is the added indication domain in the UCI, the COT sharing indication may indicate whether the UE shares a COT or not, and a gNB learns, through an indication of the added indication domain, information that can be transmitted when the UE shares the COT.

If the COT is allowed to be shared by default, an original COT sharing indication may be used to indicate the information related to a power detection threshold without an additional indication. In addition, because the gNB learns a LBT priority class of the UE, the gNB learns a MCOT of the UE, the gNB may determine duration for sharing the COT, and a sum of the duration for sharing and transmission duration of the UE does not exceed the MCOT of the UE.

In an implementation, the second specified field is valid in a case that the first device and the second device share a COT initiated by the user equipment.

In an implementation, in a case that the first device is the network device and the second device is the user equipment, if a type of the LBT is Cat4, the first specified field is used to indicate the maximum power detection threshold of the user equipment or the power detection threshold for COT sharing.

Specifically, commonly used LBT categories may be divided into category 1, category 2, and category 4. Category 1 LBT means that a sending node does not perform the LBT, that is, no LBT or immediate transmission. Category 2 LBT is a one-slot LBT, that is, the sending node performs LBT once before transmission, and transmission is performed when a channel is idle, and transmission is not performed when the channel is busy. Category 4 LBT is a channel monitoring mechanism based on back-off. When a transmission node detects that the channel is busy, it will perform back-off and continue monitoring until the channel is idle.

In this step, when the category of the LBT is Cat4, the first specified field is used to indicate the maximum power detection threshold of the user equipment or the power detection threshold for COT sharing. For another category of the LBT, the first specified field may be used as another indication, such as a length of an Extended Cyclic Prefix (ECP) filled by the UE.

S822: The second device receives the information related to a power detection threshold sent by the first device.

Correspondingly, the second device receives the information related to a power detection threshold sent by the first device in the foregoing step.

The method for sharing a channel occupancy time according to the embodiments of this application is described in detail above with reference to FIG. 1 to FIG. 8. A communications device according to an embodiment of this application will be described in detail below with reference to FIG. 8.

Figure 9:
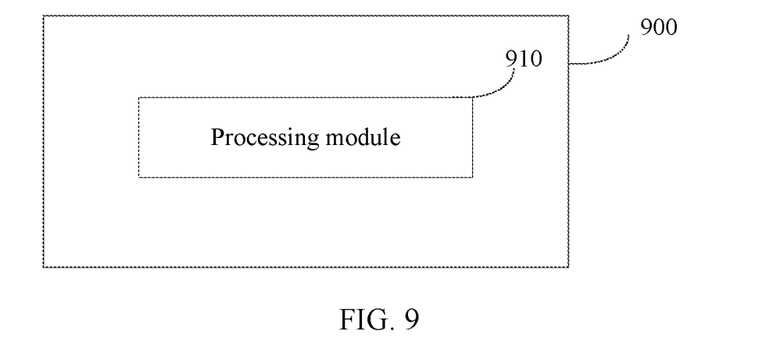
FIG. 9 is a schematic structural diagram of a communications device according to an embodiment of this application.

FIG. 9 is a schematic structural diagram of a communications device according to an embodiment of this application. As shown in FIG. 9, a communications device 900 includes a processing module 910.

The processing module 910 is configured to send information related to a power detection threshold. The information related to a power detection threshold includes: a maximum power detection threshold of user equipment, a power detection threshold for COT sharing, or a type of information transmitted by a network device.

In an implementation, a type of information transmitted by the network device includes a first type or a second type. The first type corresponds to the maximum power detection threshold of the user equipment, and the second type corresponds to the power detection threshold for COT sharing.

In an implementation, the processing module 910 is further configured to transmit information of the first type in a case that a first device is the network device and a second device is the user equipment, and in a case that the information related to a power detection threshold sent to the second device is the maximum power detection threshold of the user equipment.

In an implementation, the processing module 910 is further configured to transmit information of the second type in a case that the first device is the network device and the second device is the user equipment, and in a case that the information related to a power detection threshold sent to the second device is the power detection threshold for COT sharing.

In an implementation, the processing module 910 is further configured to send, in a case that the second device is the network device and the first device is the user equipment, the second device the maximum power detection threshold of the user equipment to indicate that the second device transmits the information of the first type.

In an implementation, the processing module 910 is further configured to send, in a case that the second device is the network device and the first device is the user equipment, the second device the power detection threshold for COT sharing to indicate that the second device transmits the information of the second type.

In an implementation, the information of the first type means that a received object includes a control signal, a control channel, a broadcast signal, or a broadcast channel of the user equipment, and the information of the second type means that a received object includes at least one of the control signal, the control channel, the broadcast signal, or the broadcast channel of the user equipment or a downlink signal/channel of the user equipment.

In an implementation, the processing module 910 is configured to indicate the information related to a power detection threshold through a specified field in control information.

In an implementation, the processing module 910 is configured to: in a case that the first device is the network device and the second device is the user equipment, the specified field in the control information is a first specified field in DCI; or in a case that the first device is the user equipment and the second device is the network device, the specified field in the control information is a second specified field in UCI.

In an implementation, the first specified field is an added indication field in the DCI; or the second specified field is a COT sharing indication in the UCI or an added indication field in the UCI.

In an implementation, the second specified field is valid in a case that the first device and the second device share a COT initiated by the user equipment.

In an implementation, in a case that the first device is the network device and the second device is the user equipment, if a type of the LBT is Cat4, the first specified field is used to indicate the maximum power detection threshold of the user equipment or the power detection threshold for COT sharing.

The communications device 900 according to this embodiment of this application may be referenced to the flows performed by the first device in the methods 100 to 800 corresponding to this embodiment of this application, and each unit/module in the communications device 900 and other operations and/or functions mentioned above are flows respectively implemented in the methods 100 to 800 and performed by the first device, and the same or equivalent technical effect can be achieved. For brevity, details are not described herein again.

Figure 10:
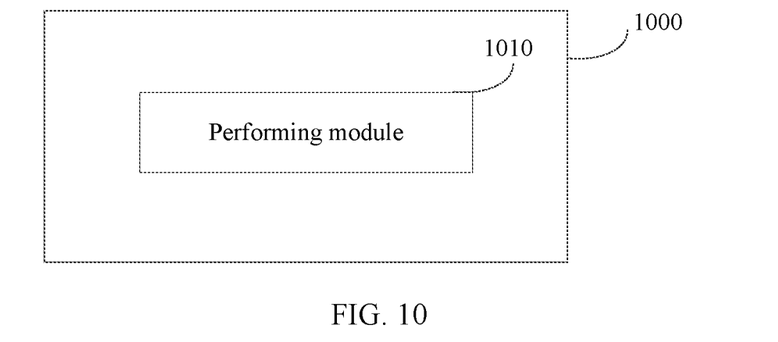
FIG. 10 is a schematic structural diagram of a communications device according to another embodiment of this application.

FIG. 10 is a schematic structural diagram of a communications device according to an embodiment of this application. As shown in FIG. 10, a communications device 1000 includes a performing module 1010.

The performing module 1010 is configured to receive information related to a power detection threshold sent by a first device. The information related to a power detection threshold includes: a maximum power detection threshold of user equipment, a power detection threshold for COT sharing, or a type of information transmitted by a network device.

In an implementation, a type of information transmitted by the network device includes a first type or a second type. The first type corresponds to the maximum power detection threshold of the user equipment, and the second type corresponds to the power detection threshold for COT sharing.

In an implementation, the performing module 1010 is further configured to receive, in a case that the first device is the network device and a second device is the user equipment, and in a case that the information related to a power detection threshold is the maximum power detection threshold of the user equipment, information of the first type transmitted by the first device.

In an implementation, the performing module 1010 is further configured to receive, in a case that the first device is the network device and the second device is the user equipment, and in a case that the information related to a power detection threshold is the power detection threshold for COT sharing, information of a second type transmitted by the first device.

In an implementation, the performing module 1010 is further configured to perform, in a case that the information of the first type transmitted by the first device is received, LBT by using the maximum power detection threshold of the user equipment.

In an implementation, the performing module 1010 is further configured to perform, in a case that the information of the second type transmitted by the first device is received, the LBT by using the power detection threshold for COT sharing.

In an implementation, the performing module 1010 is further configured to transmit the information of the first type in a case that the second device is the network device and the first device is the user equipment, and in a case that the received information related to a power detection threshold is the maximum power detection threshold of the user equipment.

In an implementation, the performing module 1010 is further configured to transmit the information of the second type in a case that the second device is the network device and the first device is the user equipment, and in a case that the received information related to a power detection threshold is the power detection threshold for COT sharing.

In an implementation, the information of the first type means that a received object includes a control signal, a control channel, a broadcast signal, or a broadcast channel of the user equipment, and the information of the second type means that a received object includes at least one of the control signal, the control channel, the broadcast signal, or the broadcast channel of the user equipment or a downlink signal/channel of the user equipment.

In an implementation, the performing module 1010 is configured to indicate the information related to a power detection threshold through a specified field in control information.

In an implementation, the performing module 1010 is configured to: in a case that the first device is the network device and the second device is the user equipment, the specified field in the control information is a first specified field in DCI; or in a case that the first device is the user equipment and the second device is the network device, the specified field in the control information is a second specified field in UCI.

In an implementation, the first specified field is an added indication field in the DCI; or the second specified field is a COT sharing indication in the UCI or an added indication field in the UCI.

In an implementation, the second specified field is valid in a case that the first device and the second device share a COT initiated by the user equipment.

In an implementation, the performing module 1010 is configured to, in a case that the first device is the network device and the second device is the user equipment, if a type of the LBT is Cat4, the first specified field is used to indicate the maximum power detection threshold of the user equipment or the power detection threshold for COT sharing.

The communications device 1000 according to this embodiment of this application may be referenced to the flows performed by the second device in the methods 100 to 800 corresponding to this embodiment of this application, and each unit/module in the communications device 1000 and other operations and/or functions mentioned above are flows respectively implemented in the methods 100 to 800 and performed by the second device, and the same or equivalent technical effect can be achieved. For brevity, details are not described herein again.

Figure 11:
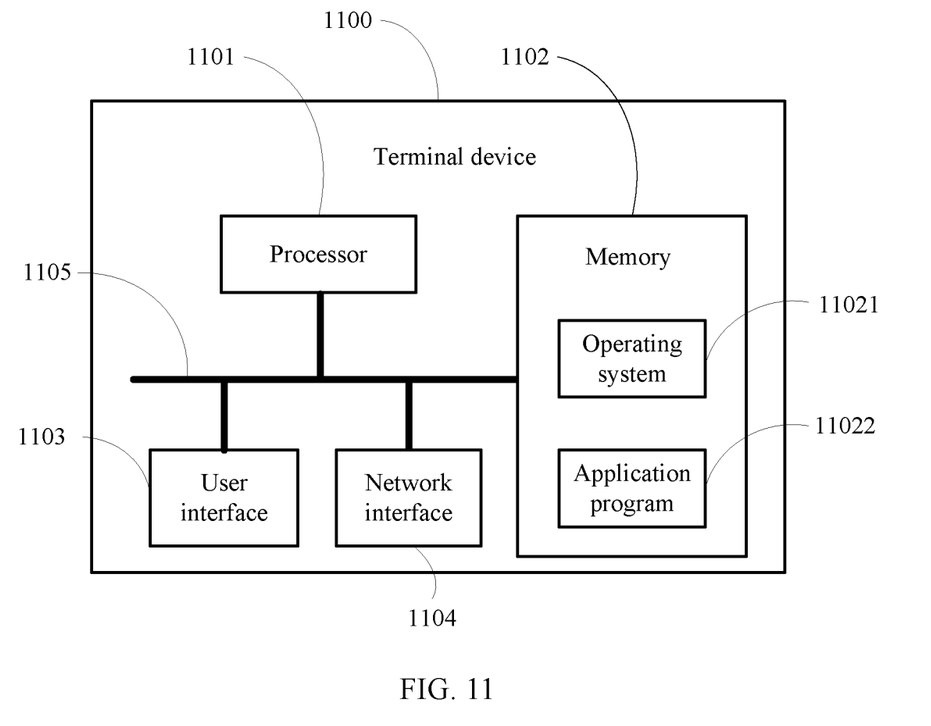
FIG. 11 is a schematic structural diagram of a terminal device according to still another embodiment of this application.

FIG. 11 is a block diagram of a terminal device according to still another embodiment of this application. As shown in FIG. 11, the terminal device 1100 includes: at least one processor 1101, a memory 1102, at least one network interface 1104, and a user interface 1103. All components of the terminal device 1100 are coupled together by using a bus system 1105. It can be understood that the bus system 1105 is configured to implement a connection and communication between these components. In addition to a data bus, the bus system 1105 further includes a power bus, a control bus, and a status signal bus. However, for clear description, various buses are marked as the bus system 1105 in FIG. 11.

The user interface 1103 may include a display, a keyboard, or a clicking device (for example, a mouse, a trackball), a touch panel, or a touchscreen.

It can be understood that the memory 1102 in the embodiments of this application may be a volatile memory or a nonvolatile memory, or may include a volatile memory and a nonvolatile memory. The nonvolatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), which is used as an external cache. Through example but not limitative description, many forms of RAMs may be used, for example, a Static RAM (SRAM), a Dynamic RAM (DRAM), a Synchronous DRAM (SDRAM), a Double Data Rate SDRAM (DDRSDRAM), an Enhanced SDRAM (ES-DRAM), a Synchlink DRAM (SLDRAM), and a Direct Rambus RAM (DRRAM). The memory 1102 in the system and the method that are described in the embodiments of this application is to include but is not limited to these and any other suitable types of memories.

In some implementations, the memory 1102 stores the following elements: an executable module or a data structure, a subset thereof, or an extended set thereof: an operating system 11021 and an application program 11022.

The operating system 11021 includes various system programs, such as a framework layer, a core library layer, a driver layer, and the like, and is configured to implement various base station's services and process hardware-based tasks. The application program 11022 includes various application programs, for example, a media player, a browser, and the like, and is configured to implement various application services. A program for implementing the method in the embodiments of this application may be included in the application program 11022.

In this embodiment of this application, the terminal device 1100 further includes a computer program that is stored in the memory 1102 and that can be run on the processor 1101, and when the computer program is executed by the processor 1101, the steps performed by the terminal device, as the first device or the second device, in the above methods 100 to 800 are implemented.

The methods disclosed in the foregoing embodiments of this application may be applied to the processor 1101, or may be implemented by the processor 1101. The processor 1101 may be an integrated circuit chip having a signal processing capability. During implementation, each step of the foregoing method may be completed by using an integrated logic circuit of hardware or an instruction in a form of software in the processor 1101. The processor 1101 may be a general purpose processor, a Digital Signal Processor (DSP), an Application Specific Integrated Circuit (ASIC), a Field Programmable Gate Array (FPGA), another programmable logic device, a discrete gate, a transistor logic device, or a discrete hardware component. The processor may implement or perform the methods, steps, and logical block diagrams that are disclosed in the embodiments of this application. The general purpose processor may be a microprocessor or may be any conventional processor or the like. Steps of the methods disclosed with reference to the embodiments of this application may be directly executed and accomplished through a hardware decoding processor, or may be executed and accomplished by using a combination of hardware and software modules in the decoding processor. The software module may be located in a mature computer-readable storage medium in this field such as a random access memory, a flash memory, a read-only memory, a programmable read-only memory, an electrically erasable programmable memory, a register, or the like. The computer-readable storage medium is located in the memory 1102, and the processor 1101 reads information from the memory 1102 and completes the steps of the foregoing method in combination with hardware of the processor. Specifically, the computer readable storage medium stores a computer program, and when the computer program is executed by the processor 1101, the steps performed by the terminal device, as the first device or the second device, in the methods 100 to 800, are implemented.

It can be understood that the embodiments described in the embodiments of this application may be implemented by hardware, software, firmware, middleware, microcode, or a combination thereof. For implementation with hardware, a processing unit can be implemented in one or more ASICs, DSPs, DSP Devices (DSPDs), Programmable Logic Devices (PLDs), FPGAs, general processors, controllers, micro-controllers, microprocessors, and another electronic unit for implementing the functions of this application, or their combinations.

For implementation with software, the technologies in the embodiments of this application may be implemented through modules (for example, procedures or functions) that perform the functions in the embodiments of this application. A software code may be stored in the memory and executed by the processor. The memory may be implemented inside or outside the processor.

The terminal device 1100 can implement each process implemented by the terminal device in the foregoing embodiments, and the same or equivalent technical effect can be achieved. To avoid repetition, details are not described herein again.

Figure 12:
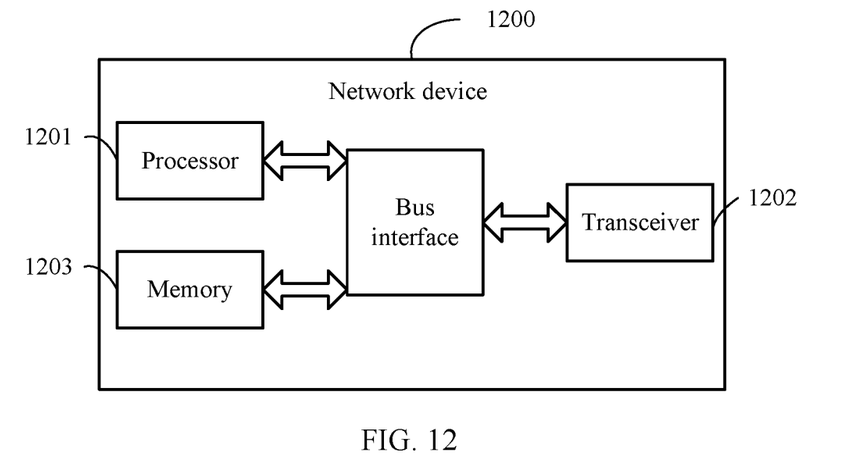
FIG. 12 is a schematic structural diagram of a network device according to yet another embodiment of this application.

Referring to FIG. 12, FIG. 12 is a structural diagram of a network device applied according to an embodiment of this application, which can implement the details of each step performed by the network device, as the first device or the second device, in the embodiments of methods 100 to 800, and the same effect can be achieved. As shown in FIG. 12, a network device 1200 includes a processor 1201, a transceiver 1202, a memory 1203, and a bus interface.

In this embodiment of this application, the network device 1200 further includes a computer program that is stored in the memory 1203 and that can be run on the processor 1201, and when the computer program is executed by the processor 1201, the steps performed by the network device, as the first device or the second device, in the methods 100 to 800 are implemented.

In FIG. 12, a bus architecture may include any quantity of interconnected buses and bridges, which are specifically connected together by one or more processors represented by the processor 1201 and various circuits of a memory represented by the memory 1203. The bus architecture may further link various other circuits such as those of a peripheral device, a voltage regulator, and a power management circuit. These are well known in the art, and therefore are not further described in this specification. The bus interface provides an interface. The transceiver 1202 may be a plurality of components. To be specific, the transceiver includes a transmitter and a receiver, and provides a unit configured to communicate with various other apparatuses on a transmission medium.

The processor 1201 is responsible for managing the bus architecture and common processing, and the memory 1203 may store data used when the processor 1201 performs an operation.

This embodiment of this application further provides a computer-readable storage medium, and the computer-readable storage medium stores a computer program, where when the computer program is executed by the processor, the details of each step performed by the network device, as the first device or the second device, in the foregoing method embodiments 100 to 800 are implemented, and the same technical effect can be achieved. To avoid repetition, details are not described herein again. The computer-readable storage medium is, for example, a ROM, a RAM, a magnetic disk, an optical disk, or the like.

It should be noted that in this specification, the terms "comprise", "include" and any other variants thereof are intended to cover non-exclusive inclusion, so that a process, a method, an article, or a device that includes a series of elements not only includes these very elements, but may also include other elements not expressly listed, or also include elements inherent to this process, method, article, or device. An element limited by "includes a . . . " does not, without more constraints, preclude the presence of additional identical elements in the process, method, article, or device that includes the element.

Based on the foregoing descriptions of the embodiments, a person skilled in the art may clearly understand that the method in the foregoing embodiment may be implemented by software in addition to a necessary universal hardware platform or by hardware only. In most circumstances, the former is an exemplary implementation manner. Based on such understanding, the technical solutions of this application essentially, or the part contributing to the prior art may be implemented in a form of a software product. The computer software product is stored in a storage medium (for example, a ROM/RAM, a magnetic disk, or a compact disc), and includes several instructions for instructing a terminal (which may be a mobile phone, a computer, a server, an air conditioner, a network device, or the like) to perform the method described in the embodiments of this application.

The embodiments of this application are described above with reference to the accompanying drawings, but this application is not limited to the above specific implementations, and the above specific implementations are only illustrative and not restrictive. Under the enlightenment of this application, those of ordinary skill in the art can make many forms without departing from the purpose of this application and the protection scope of the claims, all of which fall within the protection of this application.

The invention claimed is:

1. A method for sharing a channel occupancy time, executed by a first device, comprising:
sending information related to a power detection threshold to a second device,
wherein the information related to the power detection threshold comprises a maximum power detection threshold of a user equipment for Channel Occupancy Time (COT) sharing,
wherein in a case that the second device is the network device and the first device is the user equipment, sending the information related to the power detection threshold to the second device comprises:
sending the second device the maximum power detection threshold of the user equipment to indicate that the second device transmits a type of information corresponding to the maximum power detection threshold of the user equipment to the first device, and
wherein the first device performs Listen Before Talk (LBT) by using the maximum power detection threshold of the user equipment to replace the power detection threshold of the COT sharing.

2. The method according to claim 1, wherein in a case that the first device is the network device and the second device is the user equipment, the method comprises:
transmitting the type of information corresponding to the maximum power detection threshold of the user equipment in a case that the information related to the power detection threshold sent to the second device comprises the maximum power detection threshold of the user equipment.

3. The method according to claim 1, wherein sending the information related to the power detection threshold to the second device comprises:
indicating the information related to the power detection threshold through a specified field in control information, wherein
in a case that the first device is the network device and the second device is the user equipment, the specified field in the control information is a first specified field in Downlink Control Information (DCI); or
in a case that the first device is the user equipment and the second device is the network device, the specified field in the control information is a second specified field in Uplink Control Information (UCI).

4. The method according to claim 3, wherein the first specified field is an added indication field in the DCI; or the second specified field is a COT sharing indication in the UCI or an added indication field in the UCI.

5. The method according to claim 4, wherein when the COT is shared by default, the COT sharing indication in the UCI is reused to indicate the information related to the power detection threshold.

6. The method according to claim 4, wherein the COT sharing indication in the UCI is used to indicate whether the user equipment shares a COT or not, and the added indication field in the UCI is used to indicate the information related to the power detection threshold.

7. The method according to claim 3, wherein the second specified field indicates the information related to the power detection threshold in a case that the first device and the second device share a COT initiated by the user equipment.

8. The method according to claim 3, wherein when a category of LBT is Cat4, the first specified field is used to indicate the maximum power detection threshold of the user equipment.

9. The method according to claim 1, wherein in a case that the first device is the network device, the second device is the user equipment, and the information related to the power detection threshold sent to the second device comprises the type of information corresponding to the maximum power detection threshold of the user equipment, the method further comprises:
indicating that the second device performs the LBT by using the maximum power detection threshold of the user equipment to replace the power detection threshold of the COT sharing.

10. The method according to claim 1, wherein in a case that the second device is the network device and the first device is the user equipment, a transmission time of transmitting the type of information corresponding to the maximum power detection threshold of the user equipment from the second device to the first device is within a predetermined period of time.

11. A method for sharing a channel occupancy time executed by a second device, comprising:
receiving information related to a power detection threshold sent by a first device, wherein:
the information related to the power detection threshold comprises a maximum power detection threshold of a user equipment for Channel Occupancy Time (COT) sharing;
in a case that the second device is the network device and the first device is the user equipment, receiving the information related to the power detection threshold from the first device comprises:
receiving, from the first device, the maximum power detection threshold of the user equipment to indicate that the second device transmits a type of information corresponding to the maximum power detection threshold of the user equipment to the first device; and
the method further comprises performing Listen Before Talk (LBT) by using the maximum power detection threshold of the user equipment to replace the power detection threshold of the COT sharing.

12. The method according to claim 11, wherein in a case that the first device is the network device and the second device is the user equipment, the method comprises:
in a case that the information related to the power detection threshold is the maximum power detection threshold of the user equipment, performing channel monitoring according to the maximum power detection threshold of the user equipment, and receiving the type of information corresponding to the maximum power detection threshold of the user equipment transmitted by the first device.

13. The method according to claim 11, wherein in a case that the second device is the network device and the first device is the user equipment, the method comprises:
transmitting the type of information corresponding to the maximum power detection threshold of the user equipment in a case that the received information related to the power detection threshold is the maximum power detection threshold of the user equipment.

14. The method according to claim 11, wherein receiving the information related to the power detection threshold sent by the first device comprises:
indicating the information related to the power detection threshold through a specified field in control information, wherein
in a case that the first device is the network device and the second device is the user equipment, the specified field in the control information is a first specified field in Downlink Control Information (DCI); or
in a case that the first device is the user equipment and the second device is the network device, the specified field in the control information is a second specified field in Uplink Control Information (UCI).

15. The method according to claim 14, wherein the first specified field is an added indication field in the DCI; or the second specified field is a COT sharing indication in the UCI or an added indication field in the UCI.

16. The method according to claim 14, wherein the second specified field indicates the information related to the power detection threshold in a case that the first device and the second device share a COT initiated by the user equipment.

17. The method according to claim 14, wherein when a category of LBT is Cat4, the first specified field is used to indicate the maximum power detection threshold of the user equipment.

18. A communications device, comprising a second device, wherein the second device comprises: a memory, a processor, and a computer program stored in the memory, wherein the computer program, when executed by the processor, causes the processor to implement the method of claim 11.

19. A communications device, comprising a first device, wherein the first device comprises: a memory, a processor, and a computer program stored in the memory, wherein the computer program, when executed by the processor, causes the processor to implement operations comprising:
sending information related to a power detection threshold to a second device,
wherein the information related to the power detection threshold comprises a maximum power detection threshold of a user equipment for Channel Occupancy Time (COT) sharing,
wherein in a case that the second device is the network device and the first device is the user equipment, sending the information related to the power detection threshold to the second device comprises:
sending the second device the maximum power detection threshold of the user equipment to indicate that the second device transmits a type of information corresponding to the maximum power detection threshold of the user equipment to the first device, and
wherein the first device performs Listen Before Talk (LBT) by using the maximum power detection threshold of the user equipment to replace the power detection threshold of the COT sharing.

20. The communications device according to claim 19, wherein in a case that the first device is the network device and the second device is the user equipment, the operations comprise:
transmitting the type of information corresponding to the maximum power detection threshold of the user equipment in a case that the information related to the power detection threshold sent to the second device is the maximum power detection threshold of the user equipment.

* * * * *